US012762327B2

(12) United States Patent
Saleh et al.

(10) Patent No.: US 12,762,327 B2
(45) Date of Patent: Oct. 13, 2026

(54) GUIDED PROMPT CREATION VIA FOUNDATION MODEL INTEGRATIONS IN APPLICATION ENVIRONMENTS

(71) Applicant: Microsoft Technology Licensing, LLC, Redmond, WA (US)

(72) Inventors: Sarah Ragab Ismail Saleh, Vancouver (CA); Kunal Prakash Mishra, Vancouver (CA); Daniel Alberto Castellon, Ayer, MA (US); Ian William Mikutel, Kirkland, WA (US); Erez Kikin Gil, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 18/515,645

(22) Filed: Nov. 21, 2023

(65) Prior Publication Data

US 2025/0165697 A1 May 22, 2025

(51) Int. Cl.
*G06F 40/166* (2020.01)
*G06F 3/0482* (2013.01)
*G06F 3/0484* (2022.01)

(52) U.S. Cl.
CPC .......... *G06F 40/166* (2020.01); *G06F 3/0482* (2013.01); *G06F 3/0484* (2013.01)

(58) Field of Classification Search
CPC ..... G06F 40/166; G06F 3/0482; G06F 3/0484
See application file for complete search history.

(56) References Cited

U.S. PATENT DOCUMENTS

| | | | | |
|---|---|---|---|---|
| 7,149,983 B1 * | 12/2006 | Robertson | G06F 16/248 | 715/810 |
| 2013/0036137 A1 * | 2/2013 | Ollis | G06F 16/951 | 707/E17.014 |
| 2019/0236217 A1 * | 8/2019 | Eroshin | G06F 40/279 | |
| 2019/0370369 A1 * | 12/2019 | Kulkarni | G06F 16/9535 | |
| 2021/0082419 A1 * | 3/2021 | Tran | G09B 7/00 | |
| 2021/0374133 A1 * | 12/2021 | Lin | G06F 16/24522 | |
| 2023/0297887 A1 * | 9/2023 | Gurgu | G06N 20/00 | 706/12 |
| 2025/0005299 A1 * | 1/2025 | Padmanabhan | G06F 16/335 | |
| 2025/0061284 A1 * | 2/2025 | Downs | G06F 40/186 | |

* cited by examiner

*Primary Examiner* — William L Bashore
*Assistant Examiner* — Gregory A Distefano

(57) ABSTRACT

Systems, methods, and software are disclosed herein for guided prompt creation via foundation model integrations in application environments. In an implementation, a computing device displays a user interface of an application. Within the user interface, the computing device displays modifier key components for modifying a prompt to be submitted to a foundation model. The selection of any one of the modifier key components adds a corresponding modifier key to the prompt. The computing device obtains modifier values from the foundation model based on the prompt. The computing device also displays modifier value components in the user interface; the selection of a modifier value component adds a corresponding modifier value to the prompt. The computing device submits the prompt to the foundation model and displays a reply from the foundation model in the user interface.

20 Claims, 8 Drawing Sheets

700

| MODIFIER | DESCRIPTION | MODIFIER KEY | STATIC MODIFIER VALUES |
|---|---|---|---|
| TOPIC | "Specify subject or theme" | "Suggest ideas for" | Sportswear marketing slogans, Improving team productivity |
| AUDIENCE | "Tailor for specific recipients" | "Tailor ideas for" | Informal, Formal, Humorous, Inspiring |
| TONE | "Define style or mood" | "Make it sound" | Teenagers, Professionals, Academics, Entrepreneurs, Gamers |
| PLATFORM | "Suitable for specific medium" | "Ideas suitable for" | Social media, A marketing brochure |
| PERSPECTIVE | "From the perspectives of" | "From the perspective of" | A student, A historian, A scientist |
| KEYWORDS | "Include specific terms" | "Include keywords" | Exciting, Professional, Healthful |
| AVOID | "Exclude certain topics" | "Avoid" | Limited, Mature, Suggestive |
| START WITH | "Begin with word/phrase" | "Start ideas with" | Welcome, Try, Experience, Introducing |
| END WITH | "Conclude with word/phrase" | "End ideas with" | Enjoy, Visit, You'll be glad |

FIGURE 7

GUIDED PROMPT CREATION VIA FOUNDATION MODEL INTEGRATIONS IN APPLICATION ENVIRONMENTS

TECHNICAL FIELD

Aspects of the disclosure are related to the field of software applications and foundation model integrations in application environments.

BACKGROUND

Foundation models, such as GPT-4, Dall-E, Bard, BERT, and the like, are capable of rapidly generating useful, creative content in response to effective prompting. However, using these models for content creation often relies on carefully thought-out natural language prompts. When a foundation model receives a prompt that is vague or unclear or leaves out important details, the output generated by the model will likely reflect that uncertainty or imprecision, leading the user to continually refine the prompt in order to generate the desired output (or something close to it). Thus, users who are unfamiliar with foundation models or lack experience interacting with them are often at a disadvantage in using the models to generate content. While the randomness inherent in the models' creativity is a feature, for many users, generating optimal content ends up being a matter of luck more than it should. But even experienced users will not be able to fully exploit a model's capabilities if they are unaware of every capability that the model has.

To generate the desired output, a user may engage in a multi-turn conversational exchange with the foundation model until the user gets useful content, but this can be time-consuming, may consume an excessive amount of processing resources, and may distract the user from the user's primary task. For example, when an interaction with a foundation model is begun, if the foundation model gets off to a false start, the user may fruitlessly try to steer the foundation model back onto the right track before starting over with a new conversation. Strategies have evolved to improve the effectiveness of users' prompts. For example, a user may resort to canned prompts to generate content, but this undercuts the ability of the models to generate unexpectedly creative content. Other strategies include using fine-tuned models for content generation, but this narrows the scope with regard to the type of output that can be generated. As a result of the frustrations users may encounter in trying to generate useful content, these models may be underutilized for content generation.

Overview

Technology is disclosed herein for guided prompt creation via foundation model integrations in application environments. In an implementation, a computing device displays a user interface of an application. Within the user interface, the computing device displays modifier key components for modifying a prompt to be submitted to a foundation model. The selection of any one of the modifier key components adds a corresponding modifier key to the prompt. The computing device obtains modifier values from the foundation model based on the prompt. The computing device also displays modifier value components in the user interface; the selection of a modifier value component adds a corresponding modifier value to the prompt. The computing device submits the prompt to the foundation model and displays a reply from the foundation model in the user interface.

In an implementation, the prompt as submitted to the foundation model includes first and second modifier keys and first and second modifier values. In an implementation, the computing device receives user input including a custom modifier value and adds the custom modifier value to the prompt.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates modifiers for guided prompt generation via a foundation model integration in an implementation.

DETAILED DESCRIPTION

Figure 1:
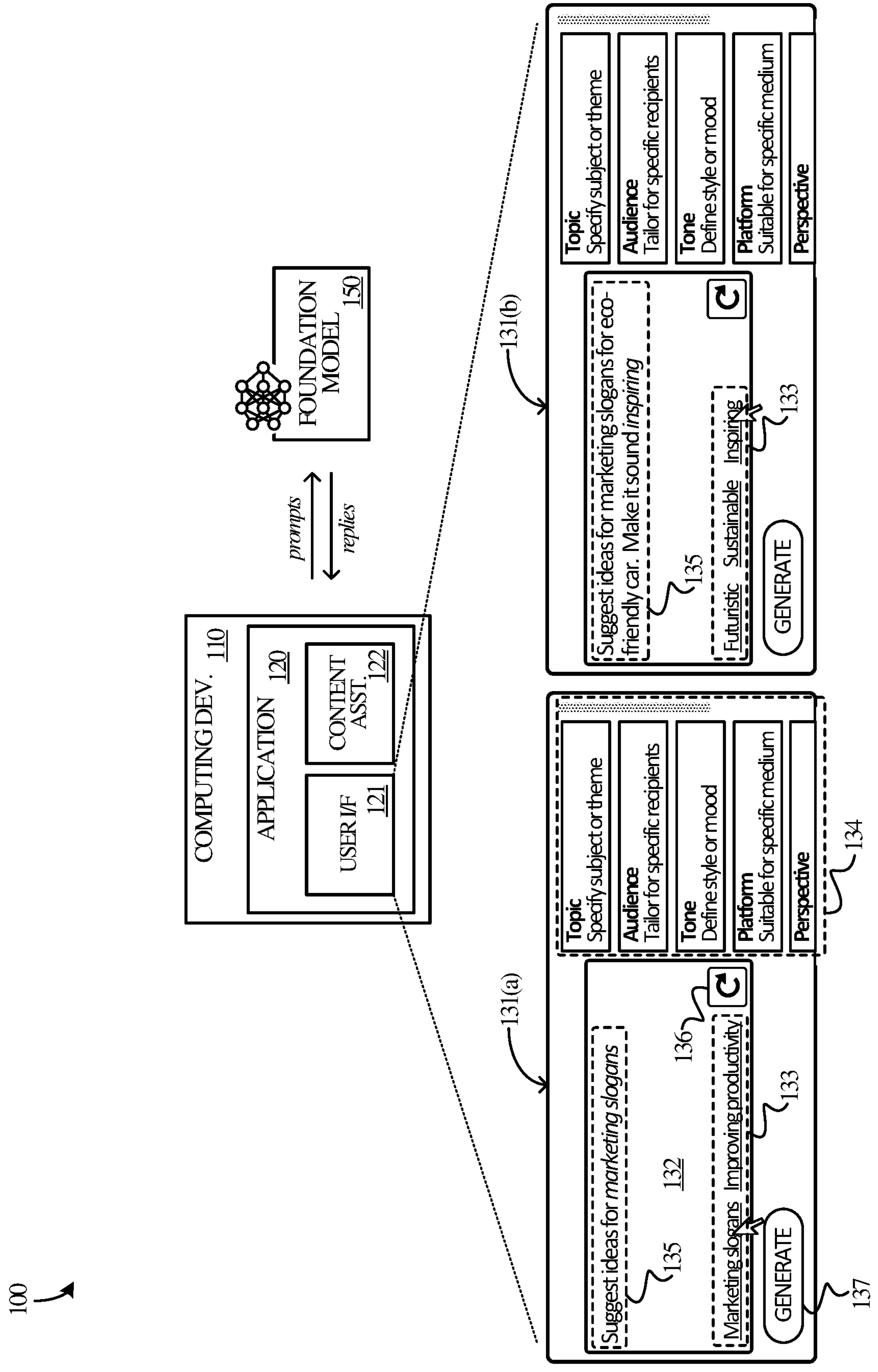
FIG. 1 illustrates an operational environment for guided prompt generation via a foundation model integration in an implementation.

Various implementations are disclosed herein for guiding a user to write prompts for foundation models, such as large language models, in an application environment to generate useful content, such as text, images, charts, slide presentations, video clips, audio clips, programming code, and so on. In an implementation, a user opens an application assistant for generating content for a document, project canvas, etc. The application assistant presents a user interface which includes a textbox for assembling a natural language prompt and multiple options for selecting modifier keys for the prompt. Each modifier key is used to add a particular focus or direction to the prompt which in turn focuses or directs the model in how it generates its output. For example, for a word processing application, the various modifier key options presented may invite the user to indicate the intended audience, the intended tone of the writing, the use of particular keywords, words to avoid, and so on. In the interface, selecting a modifier key component adds a modifier key string for a command to the prompt in the textbox (e.g., "Suggest ideas for"). The prompt, in this incomplete state, is submitted by the application assistant to the foundation model to request and obtain suggestions for values for completing the instruction. In some instances, contextual information from the document may be included to guide the foundation model in crafting the suggested modifier values. When the suggested modifier values for the selected modifier key are received, the application assistant displays them in the user interface. The user may select a value which is appended to the modifier key in the prompt in the textbox. If desired, the user can request a new set of suggested modifier values if none of the presented suggestions are suitable. Indeed, the user can edit the modifier key in the textbox, then request new suggestions for modifier values. Alternatively, the user may enter his/her own modifier value for the modifier key.

The user may select other modifier keys to continue crafting the prompt, with the application assistant obtaining suggested modifier values from the foundation model as each modifier key is selected. In obtaining the suggested values, the application assistant submits the prompt in its current state to the model to assist the model in tailoring its suggestions for values to complete the instruction. Ultimately, the prompt can include one or more customized instructions, each in the form of modifier key+modifier value. As the user is guided in the process of creating a prompt, the user may be inspired to add his or her custom modifiers which go beyond the available modifier key options.

When the user has completed the process of creating the prompt, the application assistant submits the prompt to the foundation model to generate the requested content. The reply generated by the foundation model in response to the prompt is displayed in the user interface, such as by populating the document in the application environment. In this way, a user can create a focused prompt for a foundation model without supplying any of the prompt text—the prompt can be created with the assistance of the foundation model before the content is created. Moreover, the process of tailoring the prompt reduces the number of interactions that would be necessary to produce truly useful content. In some scenarios, rather than creating new content, the model is prompted to revise existing content, such as editing an image or categorizing notes on a whiteboard canvas.

In various implementations, the application assistant for crafting a prompt for a foundation model can be used to procure AI-generated content in software applications such as word processing applications, presentation applications, spreadsheet applications, collaboration applications, email applications, or other applications. The application assistant may be used to prompt a foundation model to generate text content, images, audio content, video content, or programming code. The modifier key components displayed in the user interface of the application assistant may be specific to the type of application and/or type of content to be generated. For example, for a word processing document, the modifier key options may add (incomplete) instructions directed to topic, audience, tone, platform, perspective, keywords to use, words to avoid, ideas with which to start or end the to-be-generated content, length, and so on. For generating an image, the modifier key components may add modifier keys directed to subject matter, style (e.g., artist or art school, photorealistic, cartoon, etc.), camera lens, dimensions or aspect ratio, background, depth of field, color palette, etc. For generating content for a slide presentation application, the modifier keys may be directed to a number of slides, a maximum number of sentences per slide, an image style, quotes to include, and so on. Thus, the modifier key options can be tailored for the specific application and according to the functions, tools, and capabilities of the application as well as with respect to the subject matter which the user seeks to create.

In some scenarios, multiple users who are collaborating over a shared item may participate in the guided prompt generation process. For example, multiple remote users may be contributing to a project canvas of collaboration application during an online meeting or work session, with each user viewing an instance of the project canvas within an application environment on his or her respective computing device. Two or more of the remote users may collaborate to create a prompt to generate ideas or other content for the project. A first user may select a modifier key and add a value to create a first instruction which is viewed by the other users within their respective application environments. A second user may then add a second modifier key and value to the prompt. Thus, multiple users can contribute instructions to the prompt. Indeed, a first user may select a modifier key, and a second user may choose a suggested modifier value or type in a custom modifier value to complete the instruction. One user may also modify another user's contribution to the prompt, such as editing a modifier value selected or keyed in by the other user. In this way, content may then be generated which reflects the combined input of the prompt contributors.

When a user has completed crafting the prompt, the application assistant may generate a prompt object for submitting the prompt to the foundation model. The prompt object may include rules or instructions for generating and returning the content, such as returning the output in a parse-able format, limiting the token size of the output, instructing the foundation model to avoid insensitive or potentially offensive language, and so on. In some scenarios, the application assistant will task the foundation model with generating its reply according to the underlying document, such as ideas to be presented on sticky notes on a project canvas, a short paragraph for an email message, a thumbnail image, and so on.

In some scenarios, in prompting the foundation model to generate modifier values or content, the application assistant may include at least a portion of already existing content from the underlying document. By including already existing content, this provides the foundation model with additional direction in generating its output. However, in many cases, the user is starting from a blank document. When a first modifier key is added to the prompt, there may be little or no context by which the foundation model can generate its suggestions, and the suggested content may be highly variable. In these scenarios, the application assistant may surface one or more static modifier values rather than prompting the foundation model to generate them. Then, as the user begins to supply input in the prompt creation process (e.g., selecting from among multiple modifier values or entering his/her own values), this provides additional context for the foundation model to work with in subsequent generative activity.

Foundation models of the technology disclosed herein include large-scale generative artificial intelligence (AI) models trained on massive quantities of diverse, unlabeled data using self-supervised, semi-supervised, or unsupervised learning techniques. Foundation models may be based on a number of different architectures, such as generative adversarial networks (GANs), variational auto-encoders (VAEs), and transformer models, including multimodal transformer models. Foundation models capture general knowledge, semantic representations, and patterns and regularities in or from the data, making them capable of performing a wide range of downstream tasks. In some scenarios, a foundation model may be fine-tuned for specific downstream tasks. Foundation models include BERT (Bidirectional Encoder Representations from Transformers) and ResNet (Residual Neural Network). Types of foundation models may be broadly classified as or include pre-trained models, base models, and knowledge models, depending on the particular characteristics or usage of the model. Foundation models may be multimodal or unimodal depending on the modality of the inputs.

Multimodal models are a class of foundation model which extend their pre-trained knowledge and representation capabilities to handle multimodal data, such as text, image, video, and audio data. Multimodal models may leverage techniques like attention mechanisms and shared encoders to fuse information from different modalities and create joint representations. Learning joint representations across different modalities enables multimodal models to generate multimodal outputs that are coherent, diverse, expressive, and contextually rich. For example, multimodal models can generate a caption or textual description of the given image by extracting visual features using an image encoder, then feeding the visual features to a language decoder to generate a descriptive caption. Similarly, multimodal models can generate an image based on a text description (or, in some scenarios, a spoken description transcribed by a speech-to-text engine). Multimodal models work in a similar fashion with video-generating a text description of the video or generating video based on a text description.

Multimodal models include visual-language foundation models, such as CLIP (Contrastive Language-Image Pre-training), ALIGN (A Large-scale ImaGe and Noisy-text embedding), and ViLBERT (Visual-and-Language BERT), for computer vision tasks. Examples of visual multimodal or foundation models include DALL-E, DALL-E 2, Flamingo, Florence, and NOOR. Types of multimodal models may be broadly classified as or include cross-modal models, multimodal fusion models, and audio-visual models, depending on the particular characteristics or usage of the model.

Large language models (LLMs) are a type of foundation model which processes and generates natural language text. These models are trained on massive amounts of text data and learn to generate coherent and contextually relevant responses given a prompt or input text. LLMs are capable of understanding and generating sophisticated language based on their trained capacity to capture intricate patterns, semantics and contextual dependencies in textual data. In some scenarios, LLMs may incorporate additional modalities, such as combining images or audio input along with textual input to generate multimodal outputs. Types of LLMs include language generation models, language understanding models, and transformer models.

Transformer models, including transformer-type foundation models and transformer-type LLMs, are a class of deep learning models used in natural language processing (NLP). Transformer models are based on a neural network architecture which uses self-attention mechanisms to process input data and capture contextual relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformer) models, ERNIE (Enhanced Representation through kNowledge IntEgration) models, T5 (Text-to-Text Transfer Transformer), and XLNet models are types of transformer models which have been pretrained on large amounts of text data using a self-supervised learning technique called masked language modeling. Indeed, large language models, such as ChatGPT and its brethren, have been pretrained on an immense amount of data across virtually every domain of the arts and sciences. This pre-training allows the models to learn a rich representation of language that can be fine-tuned for specific NLP tasks, such as text generation, language translation, or sentiment analysis. Moreover, these models have demonstrated emergent capabilities in generating responses which are creative, open-ended, and unpredictable.

The technical effects of guiding a user in creating a prompt for a foundation model include an improved user experience in generating content for the user's particular needs. In particular, using the guided process of prompt creation, a user can craft a prompt specifically tailored to the user's needs without entering any text, thus streamlining the content generation process. By presenting the user with options for adding more focus or direction to the prompt, the output generated by the foundation model is more likely to be useful to the user, thus limiting the number of interactions between the application assistant and the foundation model, reducing the use of processing resources and related costs. So, too, does the guided process of prompt creation bring about a more general improvement in the quality of the output relative to the user's needs.

Turning now to the Figures, FIG. 1 illustrates operational environment 100 for guided prompt generation via a foundation model integration in an implementation. Operational environment 100 includes computing device 110 which hosts application 120 including user interface 121 and content assistant 122.

Figure 8:
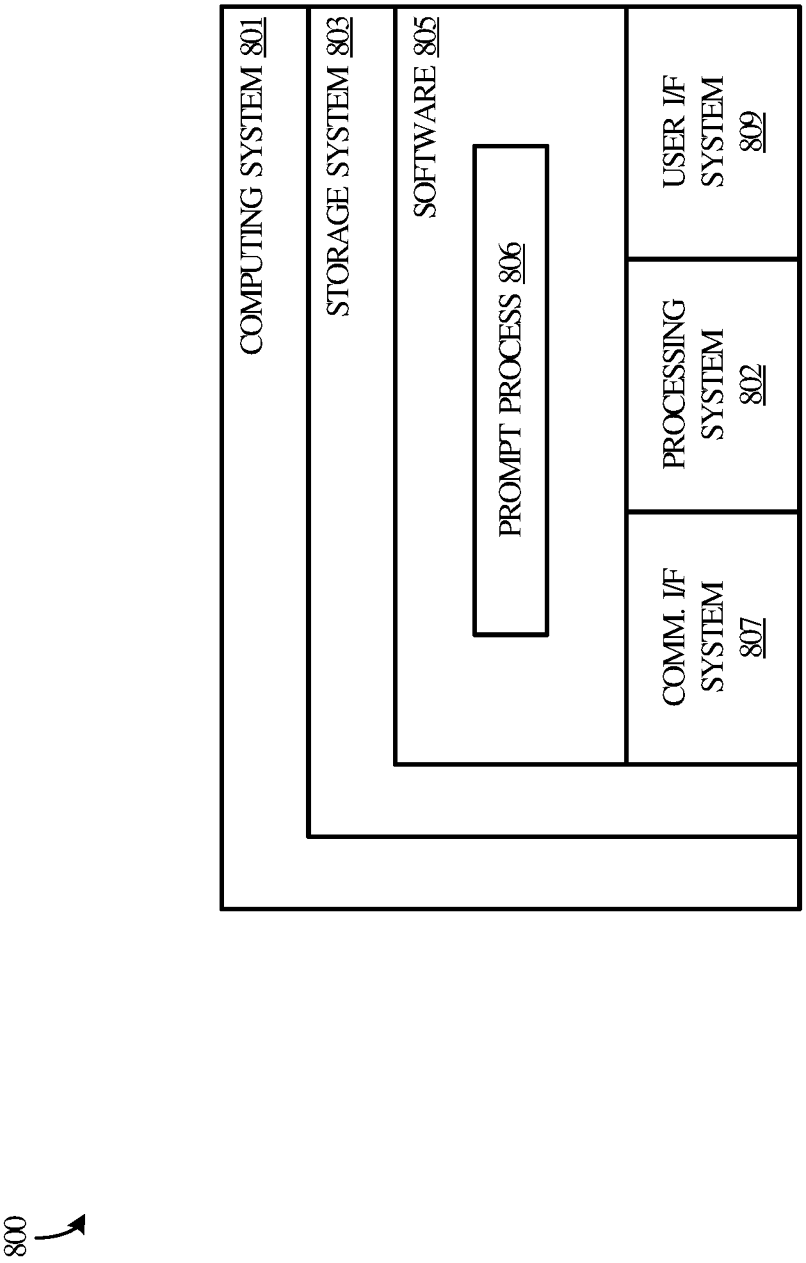
FIG. 8 illustrates a computing system suitable for implementing the various operational environments, architectures, processes, scenarios, and sequences discussed below with respect to the other Figures.

Computing device 110 is representative of a computing device, such as a laptop or desktop computer, or mobile computing device, such as a tablet computer or cellular phone, of which computing device 801 in FIG. 8 is broadly representative. Computing device 110 communicates with application 120 via one or more internets and intranets, the Internet, wired or wireless networks, local area networks (LANs), wide area networks (WANs), and any other type of network or combination thereof. A user interacts with application 120 via user interface 121 displayed on computing device 110.

Computing device 110 executes application 120 locally that provides a local user experience via user interface 121. Application 120 running locally with respect to computing device 110 may be a natively installed and executed application, a browser-based application, a mobile application, a streamed application, or any other type of application capable of interfacing with foundation model 150 and providing a user experience displayed in user interface 121 on computing device 110. Application 120 may execute in a stand-alone manner, within the context of another application, or in some other manner entirely.

Computing device 110 is in communication with foundation model 150, including sending prompts to foundation model 150 and receiving output generated by foundation model 150 in accordance with its training. User interface 121 displays prompt generation pane 131 shown in various stages of operation as panes 131(*a*) and (*b*). In panes 131(*a*)

and 131(*b*), content assistant 122 receives user input and displays output generated by foundation model 150.

User interface 121 displays a canvas hosted by application 120. For example, the canvas may be a text or word processing document, a slide presentation, a spreadsheet, a project canvas, an email, an image, or the like. In user interface 121, prompt generation pane 131 is representative of a portion of a local user experience hosted by application 120, by content assistant 122, or by another service of application 120, in an implementation.

Application 120 is representative of a software application by which a user can create and edit text-based content, such as a word processing application, a collaborative or project application, or other productivity application, and which can generate prompts for submission to foundation models, such as foundation model 150. Application 120 may execute locally on a user computing device, such as computing device 110, or application 120 may execute on one or more servers in communication with computing device 110 over one or more wired or wireless connections, causing user interface 121 to be displayed on computing device 110. In some scenarios, application 120 may execute in a distributed fashion, with a combination of client-side and server-side processes, services, and sub-services. For example, the core logic of application 120 may execute on a remote server system with user interface 121 displayed on a client device. In still other scenarios, computing device 110 is a server computing device, such as an application server, capable of displaying user interface 121, and application 120 executes locally with respect to computing device 110.

Application 120 executing locally with respect to computing device 110 may execute in a stand-alone manner, within the context of another application such as a presentation application or word processing application, or in some other manner entirely. In an implementation, application 120 hosted by a remote application service and running locally with respect to computing device 110 may be a natively installed and executed application, a browser-based application, a mobile application, a streamed application, or any other type of application capable of interfacing with the remote application service and providing local user experiences including prompt generation panes 131(*a*) and 131(*b*) displayed in user interface 121 on the remote computing device.

Foundation model 150 is representative of a deep learning model, such as BERT, ERNIE, T5, XLNet, or of a generative pretrained transformer (GPT) computing architecture, such as GPT-3®, GPT-3.5, ChatGPT®, or GPT-4. Foundation model 150 is hosted by one or more computing services which provide services by which application 120 can communicate with foundation model 150, such as an application programming interface (API). In communicating with application 120, foundation model 150 may send and receive information (e.g., prompts and replies to prompts) in data objects, such as JSON objects. Foundation model 150 may be implemented in the context of one or more server computers co-located or distributed across one or more data centers.

A brief operational scenario of operational environment 100 follows. A user of computing device 110 interacts with application 120 hosting a document displayed in user interface 121. The user launches content assistant 122 for obtaining AI-generated content, causing prompt generation pane 131 to be surfaced in user interface 121. As illustrated in FIG. 1, panes 131(*a*) and 131(*b*) include textbox 132 and modifier buttons 134. Textbox 132 displays prompt 135 as the user is guided through the process of creating it; modifier buttons 134 are components which cause modifier keys in the form of natural language text strings to be added to prompt 135 which will instruct foundation model 150 on how the content is to be generated.

To create prompt 135 for content generation, the user selects one of modifier buttons 134, such as the "Topic" button. When the user clicks a modifier button, application 120 causes the corresponding natural language string "Suggest ideas for" to be added or prepended to prompt 135 in textbox 132 (as illustrated, this is the first addition to the prompt). When text is added to textbox 132, either by application 120 or by the user, application 120 elicits from foundation model 150 suggested values for completing the modifier key. These suggestions may be displayed as ghosted text in textbox 132 (which the user can accept by tabbing over the text) or as selectable text elements which the user can click to accept. The user may also enter his/her own value to the string or cause a new set of suggestions to be generated by clicking button 136. As illustrated, the user selects the suggested value "Marketing slogans" which is appended to the modifier key string forming an instruction. The user may also modify the suggested value to further customize the instruction. As illustrated in pane 131(*b*), the user has entered a natural language string to the first instruction: "for eco-friendly car." The user may then select another modifier key to continue the prompt creation process.

To continue the process of creating prompt 135, the user may select another of modifier buttons 134 to add another instruction or additional information to prompt 135. As illustrated, when the user selects the "Tone" button, application 120 terminates the first instruction with a termination character (e.g., a period) and adds a second modifier key string to prompt 135, "Make it sound." Again, application 120 elicits suggested values for the newly added modifier key from foundation model 150. In eliciting new suggested modifier values, application 120 sends the entire prompt in its current state to foundation model 150, thereby providing contextual information reflected in the user's choice of values. The new suggestion modifier values are surfaced in textbox 132 where the user can again select from among the AI-generated offerings or enter his/her own modifier value. As illustrated in pane 131(*b*), the user selects the "Inspiring" which is appended to prompt 135.

The user may continue to add instructions to prompt 135 in textbox 132 by selecting from modifier buttons 134 to add focus or direction to the prompt. As modifier keys are added to prompt 135, the entire prompt in its current, incomplete state is sent to foundation model 150 to obtain suggested values. When the user indicates that prompt 135 is ready for submission, such as by clicking button 137 labeled "Generate," application 120 submits prompt 135 to foundation model 150. The reply generated by foundation model 150 in response to prompt 135 is returned to application 120 where application 120 displays the newly generated content in user interface 121, for example, displaying the content in a text editor window where the user can review and revise the content before adding it to the underlying canvas.

Figure 2:
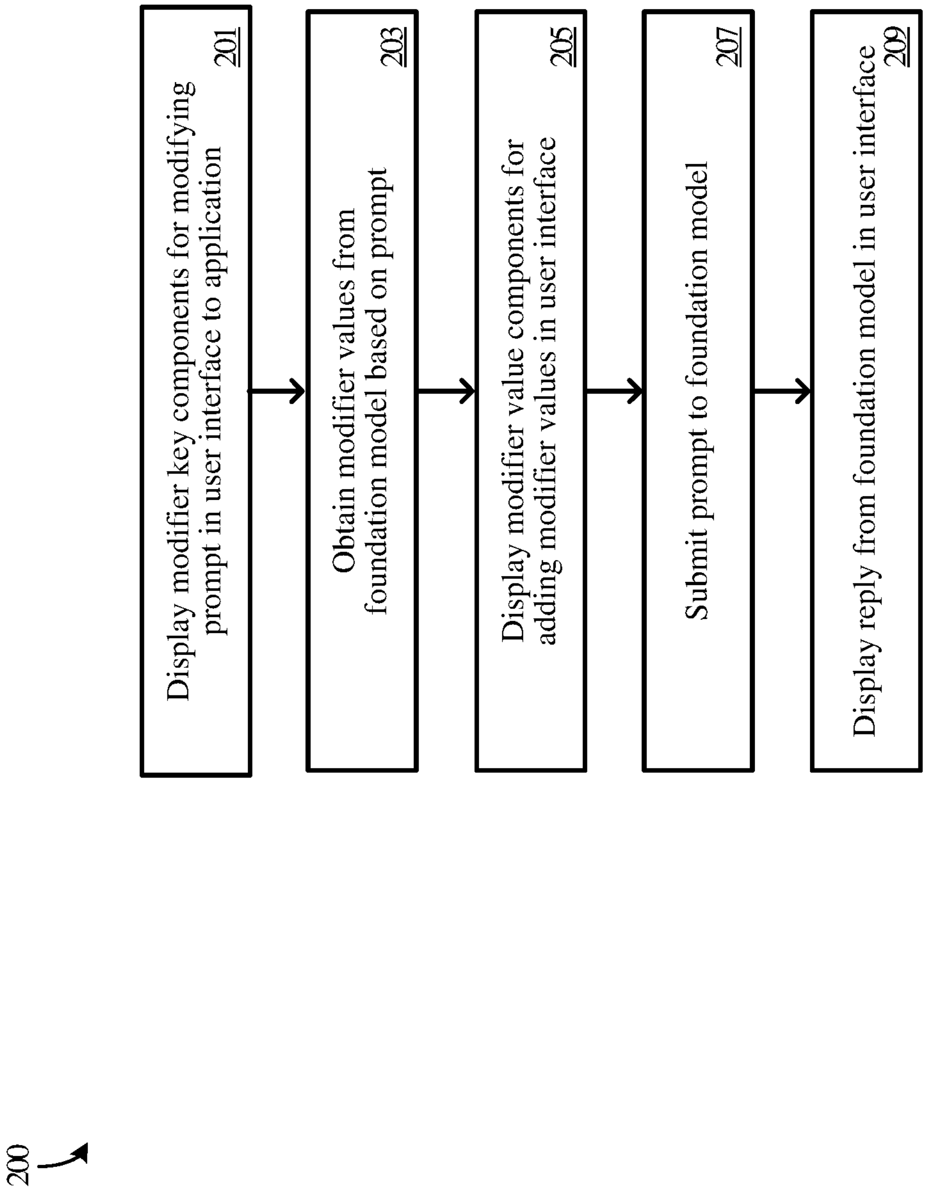
FIG. 2 illustrates a process for guided prompt generation via a foundation model integration in an implementation.

FIG. 2 illustrates a process for guided prompt generation in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

The computing device displays modifier key components in a user interface of an application (step 201). In an implementation, a user launches a functionality or service of an application for creating a natural language prompt for submission to a foundation model. The service displays a prompt generation pane which includes graphical buttons by which a user can select a modifier key to be added to the prompt. When the user selects or clicks a button, a corresponding string of modifier key text is added to a prompt. The modifier key text may be a portion of an instruction relating to content to be generated by the foundation model, such as the topic of the content, the intended audience, the tone of the writing, and so on. By presenting a number of different modifier key options, the user can select modifier keys to be added to the prompt which will help the user define or specify how the foundation model is to generate its output, resulting in more useful or more relevant content for the user.

In various implementations, the modifier key may be a string of words forming the start of an instruction or command to which additional information can be added to customize the instruction. In some cases, the modifier key may be a natural language template to which additional information can be added. The presentation of various types of modifier keys will help the user to craft a more focused prompt which will, in turn, lead to the generation of more useful content. Indeed, the list of modifier key options may inspire the user to develop his/her own instructions.

The process of content generation can be used for creating content of different modalities. For example, for generating textual content, the modifier key components may provide options for customizing the prompt and, therefore, the content to be generated by a foundation model, such as a large language model. In some cases, the modifier key components may provide options for customizing an image to be generated by a multimodal model. Still other modifier key components may provide options for customizing other types of content, such as audio tracks or video streams.

The computing device obtains modifier values from the foundation model (step 203). In an implementation, the computing device prompts the foundation model to suggest values for a selected modifier key. To prompt the foundation model, the computing device sends the entire prompt in its current state (with the newly added but incomplete modifier key) to the foundation model and tasks the foundation model with generating values for completing the instruction. By providing the entire prompt, including previously added instructions (i.e., modifier keys and values), the foundation model is provided with contextual information (e.g., the user's selections of any previous suggested values or keyed-in values) to assist with generating values which are more likely to be useful or relevant in eventually creating user's desired content. As more modifier keys and values are added to the prompt, the prompt becomes more focused which, in turn, causes the foundation model to generate output with greater depth or direction. In some instances, the computing device provides the foundation model with other contextual information for generating modifier values, such as the type of document to which the content will be added, the type of application the user is working, content already present in the document, document metadata (e.g., filename), and so on.

In tasking the model to generate modifier values, the computing device may provide other instructions or rules to the foundation model. For example, the computing device may instruct the foundation model that its suggested values are for a prompt that will be eventually submitted to the foundation model for content generation. The computing device may also instruct the model to generate multiple suggestions (e.g., at least three and/or no more than five) and to limit the token size or word length of its suggestions. Other instructions may include generating its output in a parse-able format (e.g., a JSON object with the suggested modifier values enclosed within semantic tags).

Upon prompting the foundation model to generate the modifier values, the computing device receives a response from the foundation model including the AI-generated values. The computing device displays modifier value components corresponding to the values in the user interface (step 205). For example, the computing device may parse the data object to extract the suggested values, then display graphical elements (e.g., buttons or text elements) by which the user can select one of the values. For example, one of the modifier values may be added to the end of the incomplete modifier key in a ghosted format such that the user can select the suggestion by tabbing over it. The modifier value components may also be selectable text elements or hyperlinks corresponding to the values in the prompt generation pane. When the computing device receives user input indicating a selection of a modifier value component, the corresponding value is added to the prompt.

In some implementations, if the user is dissatisfied with the suggested values, the user may submit his/her own custom value (e.g., by typing the value into a textbox displaying the prompt), or the user may select a button in the user interface which causes the computing device to prompt the foundation model to generate another set of modifier values. In prompting the foundation model to generate another set, the computing device may include the already-generated but rejected values to discourage or prevent the foundation model repeating any of the suggestions.

The process of generating the prompt for content creation may continue with the user adding modifier keys and values to the prompt in the user interface, until the user is satisfied with the prompt. The computing device then submits the prompt to the foundation model (step 207). For example, the computing device may receive user input which indicates that the prompt displayed in the user interface is ready to be submitted to the foundation model to proceed with generating the desired content. The computing device, in various implementations, configures a data object (e.g., a JSON object) including the prompt and submits the data object to the foundation model via an API hosted by the model. Upon receiving the data object, the foundation model generates its reply in response to the prompt and returns its reply to the computing device via the API. In sending the prompt to the foundation model, the computing device may include additional rules (not visible to the user) which moderate or constrain the generative activity of the foundation model, such as specifying limits on the length or size of the output, rules for avoiding potentially offensive language or content, and so on. In some instances, the submission to the foundation model is based on a template which includes a field for the prompt configured by the user along with contextual information, such as the type of document to which the content will be added, the type of application the user is working, content already present in the document, document metadata (e.g., filename), and so on.

When the computing device receives the reply from the foundation model, the computing device displays the reply in the user interface (step 209). For example, the computing device may populate the underlying document with the generated content, or the computing device may surface a preview window in which the user can review and edit the generated content before causing the computing device to add the content to the document. In various implementations, the generated content is returned by the foundation model enclosed within semantic tags by the computing device can identify and extract the content.

Returning to FIG. 1, operational environment 100 includes a brief example of process 200 as employed by elements of operational environment 100 in an implementation. Computing device 110 runs application 120 including causing a local user experience to be displayed via user interface 121. Application 120 may execute locally with respect to computing device 110, or computing device 110 may host application 120 which executes on one or more server computing devices remote from and in communication with computing device 110, or application 120 may execute in distributed, client-server fashion.

In operational environment 100, a user interacts with application 120 to generate content for a document. The document may be a word processing document in which the user is drafting textual content (e.g., an essay); in some scenarios, the user may be generating content for a collaborative canvas of a project or collaboration application or other content container. Application 120 includes services for generating content, such as content assistant 122 by which to generate content, ideas, or suggestions for the user in relation to the document.

When the user launches content assistant 122, content assistant 122 surfaces prompt generation pane 131 in user interface 121. Prompt generation pane 131 includes textbox 132 for displaying prompt 135 as it is created. Prompt 135 is created by an iterative process of putting together a set of instructions for foundation model 150, where each instruction comprises a modifier key and a modifier value, and in some instances, natural language text strings entered by the user to further customize an instruction.

When content assistant 122 receives user input indicating a selection of one of modifier buttons 134, a modifier key is added to prompt 135. The modifier key is a natural language template to which additional information is added to customize the instruction. Content assistant 122, upon receiving the user's selection of a modifier button, elicits a set of one or more suggested modifier values for the selected modifier key from foundation model 150. To elicit the suggested values, content assistant 122 sends the entirety of prompt 135 to foundation model 150 and instructs foundation model 150 to generate natural language text suggestions to complete the instruction.

Upon receiving the modifier values generated by foundation model 150, content assistant 122 surfaces the suggestions in user interface 121 as modifier value components 133. The user may select from among modifier value components 133, or the user may enter his/her own bespoke value for the modifier key, or the user may request a new set of modifier values, for example, by clicking graphical button 136 for value regeneration. To enter his/her own modifier value, the user may key in a value or speak the value into a speech-to-text engine of computing device 110.

The process continues with the user selecting others of modifier buttons 134 until the user deems prompt 135 to be ready for submission. To submit prompt 135 for content generation, the user may select "Generate" button 137 or press "Enter" when textbox 132 is in focus. Content assistant 122 sends a data object including prompt 135 to foundation model 150, instructing foundation model 150 to generate content according to prompt 135. Foundation model 150 generates the requested content and returns its reply to content assistant 122. Content assistant 122 displays the AI-generated content in user interface 121, such as by populating the underlying canvas with the generated content or displaying the content in an editor window where the user can review the content, make changes if desired, then paste the content into the canvas.

In various implementations, the content to be generated by foundation model 150 may be text, an image, or other digital content, such as audio content or video content. Content assistant 122 may display modifier buttons 134 that are unique to the type of content to be generated. Modifier buttons 134 may also be directed to genres or the user's intent within content type. For example, the options presented for creative writing generation may be different from those presented for instructional text generation.

Modifier keys associated with modifier buttons 134 may be natural language templates to which information is added to form a customized instruction for content generation. In some cases, the modifier key may be a seed or preface to an instruction or imperative sentence to which a modifier value is appended.

Figure 3:
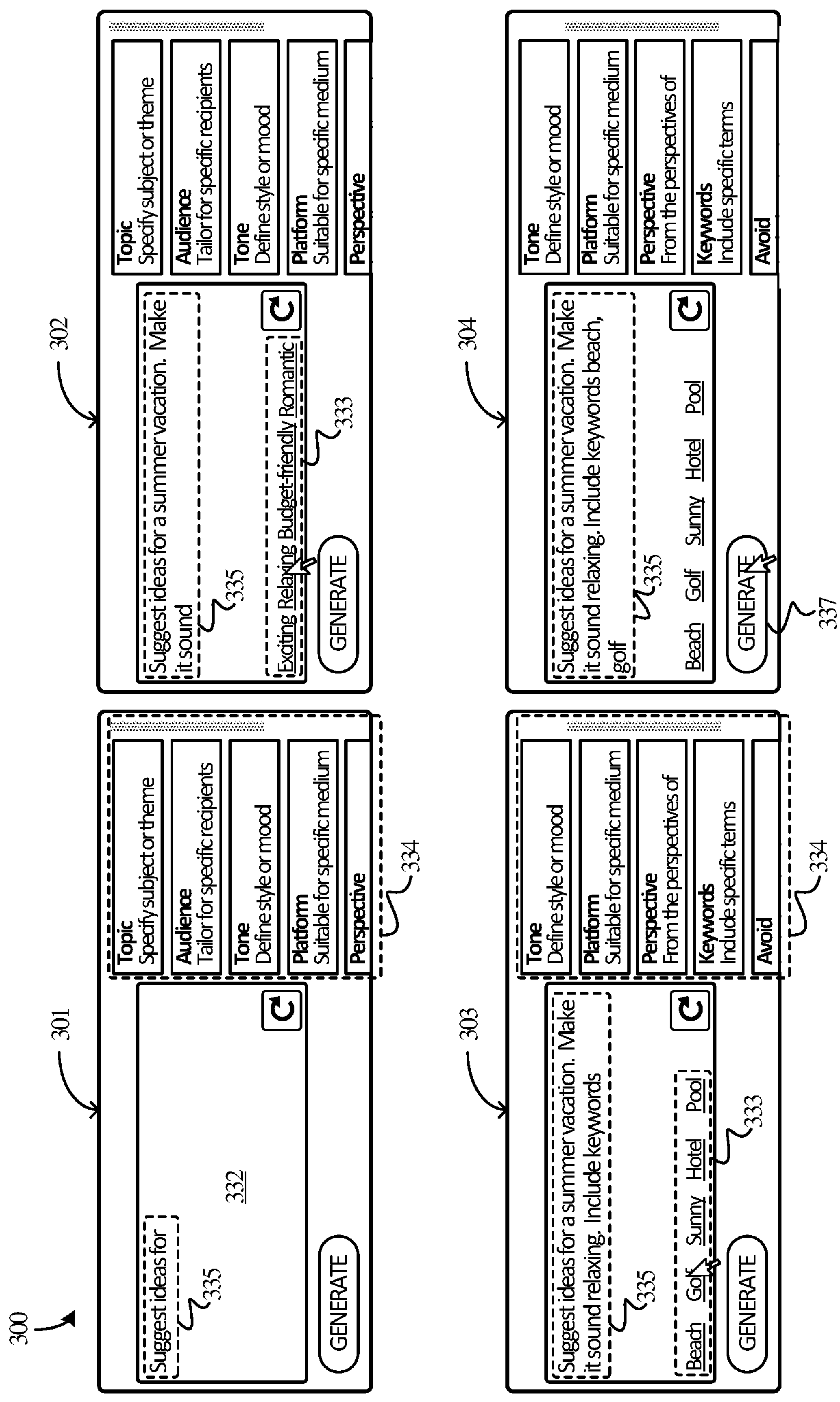
FIG. 3 illustrates an operational scenario for guided prompt generation via a foundation model integration in an implementation.

Turning now to FIG. 3, process 300 illustrates user experiences for guided prompt generation via a foundation model integration in an implementation. In process 300, a user is working in an application environment of an application, such as a word processing or presentation application, on a computing device, of which computing device 110 is representative. The user launches a tool for creating prompts for content generation from an LLM or other foundation model, of which foundation model 150 of FIG. 1 is representative. The tool, of which content assistant 122 of FIG. 1 is representative, displays panes 301-304 illustrating various stages of the guided prompt creation process. Panes 301-304 include textbox 332 and modifier key components 334 in a scrollable pane alongside textbox 332. Textbox 332 displays prompt 335 as it is created, modifier value components 333, and button 336 for generating new modifier values. Modifier key components 334 include buttons or other graphical input devices by which a user can select a particular modifier to be added to prompt 135. A brief example of the operation of process 300 follows.

In pane 301, the application suggests a modifier to begin prompt 335 ("Suggest ideas for") which the user can accept by tabbing over it. The user then enters a natural language string to customize the instruction ("a summer vacation").

In pane 302, the user selects a second modifier key component, "Tone," from among modifier key components 334 which causes the modifier key "Make it sound" to be added to prompt 335. When the user adds a modifier key of modifier key components 334 (or accepts a suggested modifier key), the application elicits one or more suggested modifier values for the modifier key from the foundation model. For example, the application sends a data object including prompt 335 in its current (incomplete) state to the foundation model and instructs the foundation model to generate values for the modifier key.

Continuing with pane 302, the application surfaces the suggested modifier values received from the foundation model as selectable modifier value components 333: "Exciting," Relaxing," "Budget-friendly," and "Romantic." The user selects the component for the modifier value "Relaxing" which the application adds to prompt 335 to form a second instruction, as illustrated in pane 303.

In pane 303, the user selects a modifier key component corresponding to keywords for the content. When the modifier key component is selected, the application sends prompt 335 to the foundation model to receive suggested values for the modifier key. Upon receiving the suggested values, the application generates and displays values components 333 for the newly generated suggested values. The user selects the modifier value components for "Beach" and "Golf" to form a third instruction which the application adds to prompt 335 to form a third instruction, as illustrated in pane 304.

Process 300 may continue with the user added instructions in the form of modifier keys and values but may also include the user entering his/her own bespoke instructions in prompt 335. When the user clicks Generate button 337, the application submits prompt 335 to the foundation model which generates and returns the requested content. Upon receiving the content, the application displays the content in the user interface where the user can review, edit, accept, or reject the content.

Figure 4:
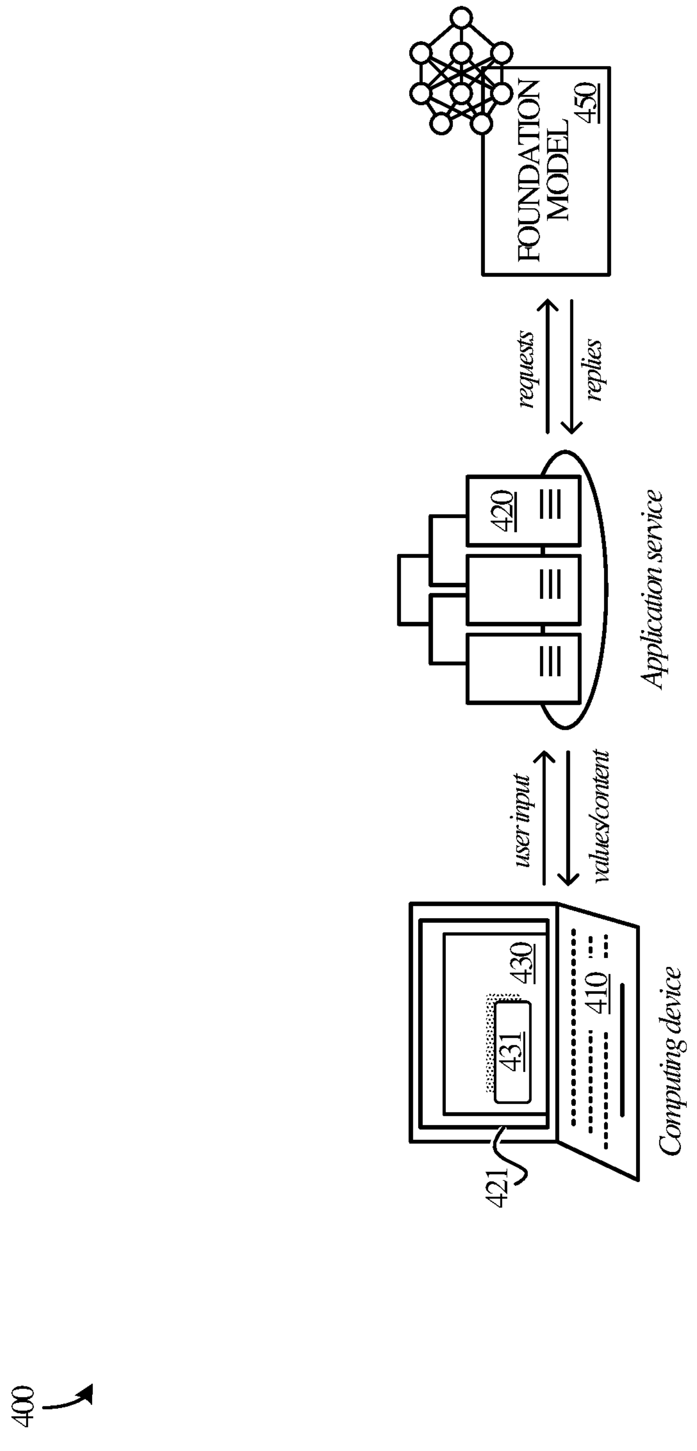
FIG. 4 illustrates an operational environment for guided prompt generation via a foundation model integration in an implementation.

FIG. 4 illustrates operational environment 400 for guided prompt generation in an application environment via a foundation model integration in an implementation. Operational environment 400 includes computing device 410, application service 420, and foundation model 450. Application service 420 hosts an application to endpoints such as computing device 410. Computing device 410 executes an application locally that provides a local user experience 421 and that interfaces with application service 420. The application running locally with respect to computing device 410 may be a natively installed and executed application, a browser-based application, a mobile application, a streamed application, or any other type of application capable of interfacing with application service 420 and providing user experience 421 displayed on computing device 410. Applications hosted by application service 420 to endpoints may execute in a stand-alone manner, within the context of another application such as a presentation application or word processing application, with a spreadsheet functionality, or in some other manner entirely.

Computing device 410 is representative of a computing device, such as a laptop or desktop computer, or mobile computing device, such as a tablet computer or cellular phone, of which computing device 801 in FIG. 8 is broadly representative. Computing device 410 communicates with application service 420 via one or more internets and intranets, the Internet, wired or wireless networks, local area networks (LANs), wide area networks (WANs), and any other type of network or combination thereof. A user interacts with an application of application service 420 via a user interface of the application displayed on computing device 410. User experience 421 displayed on computing device 410 are representative of user experiences of an application environment of application service 420 in an implementation.

Application service 420 is representative of one or more computing services capable of hosting an application and interfacing with computing device 410 and foundation model 450. Application service 420 employs one or more server computers co-located or distributed across one or more data centers connected to computing device 410. Examples of such servers include web servers, application servers, virtual or physical (bare metal) servers, or any combination or variation thereof, of which computing device 801 in FIG. 8 is broadly representative. Application service 420 may communicate with computing device 410 via one or more internets, intranets, the Internet, wired and wireless networks, local area networks (LANs), wide area networks (WANs), and any other type of network or combination thereof. Examples of services or sub-services of application service 420 include—but are not limited to—content assistants, prompt engines, and other application services.

User experience 421 displayed on computing device 410 displays document 430 and prompt generation pane 431. Prompt generation pane 431 is representative of one or more graphical devices, such as a chat pane or textbox, by which application service 420 can receive user input and display output generated by foundation model 450.

Foundation model 450 is representative of a deep learning model, such as BERT, ERNIE, T5, XLNet, or of a generative pretrained transformer (GPT) computing architecture, such as GPT-3®, GPT-3.5, ChatGPT®, or GPT-4. Foundation model 450 is hosted by one or more computing services which provide services by which application service 420 can communicate with foundation model 450, such as an application programming interface (API). Foundation model 450 may be implemented in the context of one or more server computers co-located or distributed across one or more data centers.

In operation, computing device 410 communicates with application service 420 to transmit user input received in user experience 421 (including in pane 431 for prompt generation) and to receive output from application service 420, including content and modifier values generated by foundation model 450. Application service 420 communicates with foundation model 450 to transmit requests for foundation model 450 to generate content and values and to receive replies generated in response to those requests.

Figure 5:
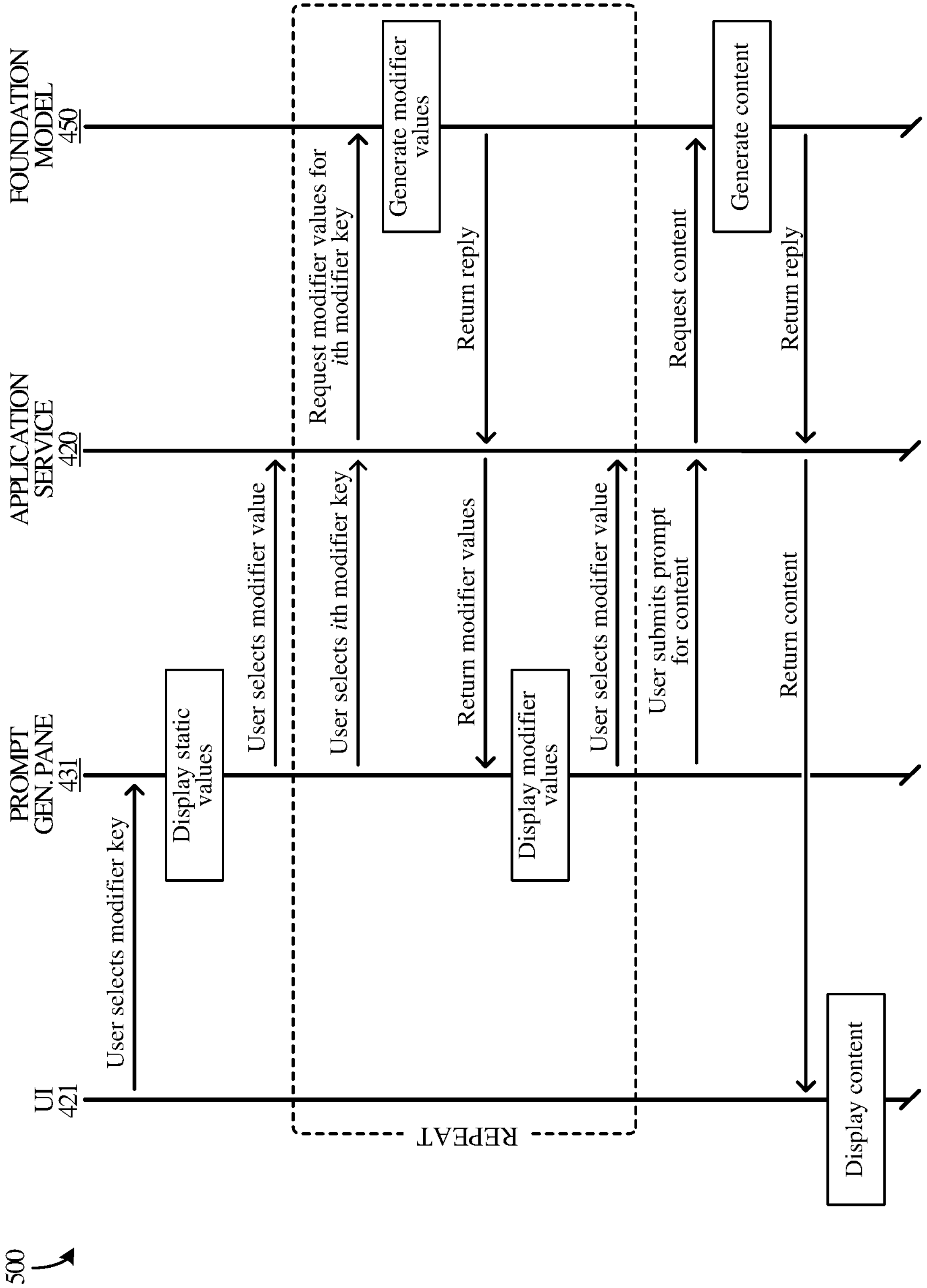
FIG. 5 illustrates an operational scenario for guided prompt generation via a foundation model integration in an implementation.

FIG. 5 illustrates operational scenario 500 for guided prompt generation via a foundation model integration in an implementation, referring to elements of FIG. 4. For the sake of illustration, it will be assumed that document 430 is blank. In operational scenario 500, a user selects a content assistant tool of application service 420, causing pane 431 to be opened in user experience 421. Pane 431 displays a set of modifier key components, examples of which are shown in FIG. 7, by which the user can add instruction modifier keys to a prompt. In pane 431, the user selects a modifier key component which causes a modifier key and a set of static values for the modifier key to be displayed. In an implementation, the static values are displayed when application service 420 determines that document 430 lacks sufficient content for foundation model 450 to generate useful content. The static values are designed to be broadly applicable to a number of different common use cases for the given application and which may prompt the user to submit his/her own modifier value. The user selects a modifier value of the static values which is then added to the prompt by application service 420.

Operational scenario 500 continues with the user making additional selections for configuring the prompt. In an iterative process, the user selects from among the modifier key components in pane 431 which causes application service 420 to submit the prompt to foundation model 450 to elicit one or more suggested modifier values. Foundation model 450 generates and returns output in response to the request, from which application service 420 extracts the one or more suggested values and displays them in pane 431. In various implementations, the suggested values are displayed as modifier value components, such as selectable text elements or hyperlinks. When the user selects a modifier value component, application service 420 adds the corresponding suggested value to the prompt. As the user selects modifier key components to add instructions to the prompt, application service 420 submits the entire prompt in its request for suggested values. In doing so, the values that were previously selected or entered by the user provide context to foundation model 450 for generating the next set of suggested values. Although the user can submit custom modifier keys or values at various points in operational scenario 500, the user can create a prompt for content generation solely on the basis of the modifier keys and AI-generated modifier values.

When application service 420 receives user input indicating that the prompt is to be submitted to foundation model 450, application service 420 transmits the prompt to foundation model 450, instructing the model to generate content in accordance with the prompt. Foundation model 450 returns output including the requested content to application service 420 which displays the content in user experience 421.

Figure 6:
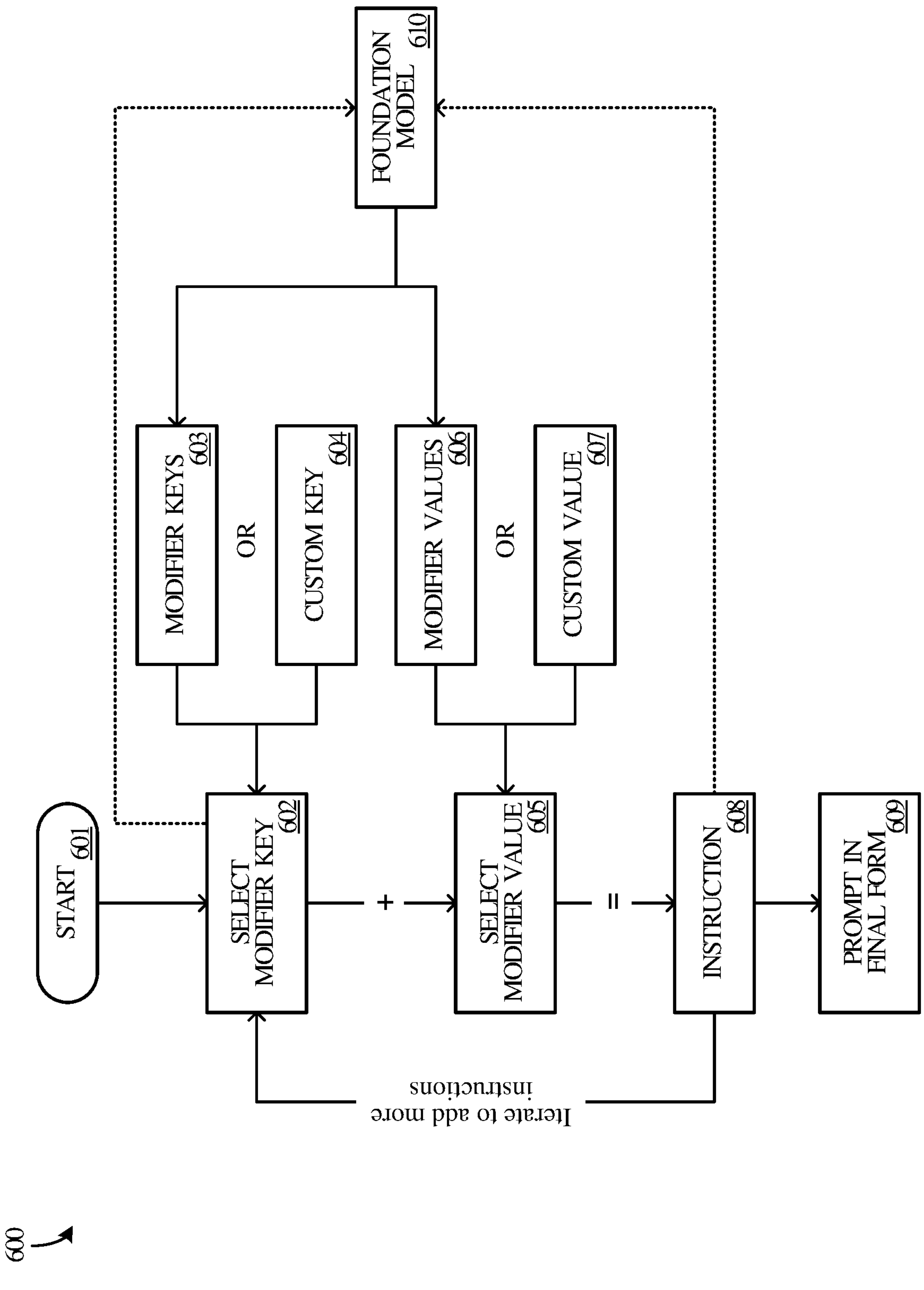
FIG. 6 illustrates a workflow for guided prompt generation via a foundation model integration in an implementation.

FIG. 6 illustrates workflow 600 for a prompt generation process via a foundation model integration, such as an LLM integration, in an implementation. In workflow 600, the user begins with an empty prompt dialog or textbox and set of modifier key components for suggested modifier keys (601) in the user interface. The user selects a modifier key (602) of the suggested modifier keys (603) or enters (e.g., types in) a custom modifier key (604) in the textbox.

When a modifier key is selected or entered, the application submits the modifier key to the foundation model (610) which will generate suggested modifier values (606) for the modifier key. The application displays selectable modifier value components for the modifier values generated by the foundation model in the user interface. In some scenarios, the application may display one of the suggested modifier values in the textbox appended to the modifier key in a ghosted format for the user to accept or reject. In some implementations, in addition to the suggested values, the foundation model will also suggest the next modifier key which the application displays in the textbox in a ghosted format for the user to accept or reject. The application adds a value to the modifier key to form a complete instruction (608) when the user selects a value (605) from among the suggested values or when the user keys in a custom value (607).

The process may continue with the user adding more modifier keys (selected from among the modifier key components or keyed in by the user) to the prompt, the application requesting modifier values for the modifier keys from the foundation model, and the user adding modifier values to the modifier keys. When the application receives user input indicating that the prompt is ready to be submitted to the foundation model, the application transmits the prompt in its final form (609) to the foundation model.

An algorithmic representation of creating a prompt for a foundation model via a process of guided prompt generation can be described as follows. To create a prompt of n instructions, each instruction is constructed as a modifier key plus a modifier value plus a termination character:

$$\text{instruction}(i) = \text{modifier\_key}(i) + \text{modifier\_value}(i) + \text{"."}$$

The n individual instructions are combined into a prompt string:

$$\text{prompt} = \sum_{i=1}^{n} \text{instruction}(i)$$

In FIG. 7, table 700 includes modifier key components and corresponding modifier keys for a system or process of guided prompt creation in an implementation. The first column of table 700 lists component modifiers for modifier key components (e.g., graphical buttons), while the second column shows a brief description of the modifier that may be displayed in association with the respective modifier key components. The third column of table 700 shows the corresponding modifier keys which would be added to a prompt when the user selects the corresponding component. The fourth column depicts static values which may be suggested to the user by the application or content assistant in lieu of a request for values from the foundation model, such as when the application determines that there is not yet enough contextual information available. The static values are examples of types of values which would be suitable for the respective modifier key. Notably, the modifier keys may be generally ordered in the user interface from general to specific (e.g., starting with "Topic," "Audience," and "Tone," then progressing to more specific modifier keys such as "Keywords," "Avoid," etc.) as might naturally occur in a process of ideation.

For a brief illustration employing selections from table 700, a user is working in a word processing document and opens a content assistant to receive AI-generated text. The user selects the "Audience" modifier for tailoring the content for specific recipients. In the textbox for creating the prompt, the application populates the textbox with the modifier key "Tailor ideas for" and displays modifier value components for static values "Teenagers," "Professionals," "Academics," and so on. The user may select from among the static values, may request AI-generated values, or may enter a custom value. The user continues to create the prompt by selecting other modifiers, such as "Perspective," for which the application obtains and displays suggested values generated by the foundation model for the selected modifier. As the user adds modifier keys and selects values for those keys, the application displays dynamically created values, rather than static values, on the basis that the user input provides context for the foundation model to generate suggested values.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements prompt process 806, which is (are) representative of the prompt processes discussed with respect to the preceding Figures, such as process 200 and workflow 600. When executed by processing system 802, software 805 directs processing system 802 to operate as described herein for at least the various processes, operational scenarios, and sequences discussed in the foregoing implementations.

Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including prompt process 806) may be implemented in program instructions and among other functions may, when executed by processing system 802, direct processing system 802 to operate as described with respect to the various operational scenarios, sequences, and processes illustrated herein. For example, software 805 may include program instructions for implementing a prompt process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support prompt processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method for generating prompts on a computing device, the method comprising:
on the computing device:
displaying, in a user interface to an application, modifier key components for modifying a prompt to be submitted to a foundation model, wherein a selection of any one of the modifier key components adds a corresponding modifier key to the prompt;
submitting, to the foundation model, a request for modifier values, wherein the request comprises contextual information from the prompt in a current incomplete state, and wherein the prompt comprises a modifier key corresponding to a selected one of the modifier key components;
receiving, from the foundation model, the modifier values generated by the foundation model based on the request, wherein the modifier values complete the modifier key to form an instruction for directing the foundation model in generating content;
displaying, in the user interface, modifier value components for adding the modifier values to the prompt, wherein a selection of any one of the modifier value components adds a corresponding one of the modifier values to the prompt;
submitting the prompt, including the modifier key and the corresponding one of the modifier values, to the foundation model; and
displaying a reply from the foundation model in the user interface.

2. The method of claim 1, wherein each modifier key corresponding to each of the modifier key components differs relative to each other modifier key corresponding to each other of the modifier key components.

3. The method of claim 2, further comprising:
in response to a selection of a first modifier key component of the modifier key components, adding a first modifier key to the prompt; and
in response to a selection of a first modifier value component of the modifier value components, adding a first modifier value to the prompt.

4. The method of claim 3, further comprising:
in response to a selection of a second modifier key component of the modifier key components, adding a second modifier key to the prompt; and
in response to a selection of a second modifier value component of the modifier value components, adding a second modifier value to the prompt.

5. The method of claim 4, wherein the prompt as-submitted to the foundation model includes the first modifier key, the first modifier value, the second modifier key, and the second modifier value.

6. The method of claim 5, wherein when the first modifier key component is selected, the first modifier key is prepended to the prompt, wherein when the first modifier value component is selected, the first modifier value is appended to the prompt, wherein when the second modifier key component is selected, the second modifier key is appended to the prompt, and wherein when the second modifier value component is selected, the second modifier value is appended to the prompt.

7. The method of claim 1, further comprising:
receiving, in the user interface, user input comprising a custom modifier value; and
adding the custom modifier value to the prompt.

8. The method of claim 1, wherein each of the modifier key components comprises a graphical button which when selected causes a corresponding modifier key to be added to the prompt and wherein each of the modifier value components comprises a selectable text element which when selected causes a corresponding one of the modifier values to be added to the prompt.

9. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
display, in a user interface to an application, modifier key components for modifying a prompt to be submitted to a foundation model, wherein a selection of any one of the modifier key components adds a corresponding modifier key to the prompt;
submit, to the foundation model, a request for modifier values, wherein the request comprises contextual information from the prompt in a current incomplete state, and wherein the prompt comprises a modifier key corresponding to a selected one of the modifier key components;
receive, from the foundation model, the modifier values generated by the foundation model based on the request, wherein the modifier values complete the modifier key to form an instruction for directing the foundation model in generating content;
display, in the user interface, modifier value components for adding the modifier values to the prompt, wherein a selection of any one of the modifier value components adds a corresponding one of the modifier values to the prompt;
submit the prompt, including the modifier key and the corresponding one of the modifier values, to the foundation model; and
display a reply from the foundation model in the user interface.

10. The computing apparatus of claim 9, wherein each modifier key corresponding to each of the modifier key components differs relative to each other modifier key corresponding to each other of the modifier key components.

11. The computing apparatus of claim 10, wherein the program instructions further direct the computing apparatus to:
in response to a selection of a first modifier key component of the modifier key components, add a first modifier key to the prompt; and
in response to a selection of a first modifier value component of the modifier value components, add a first modifier value to the prompt.

12. The computing apparatus of claim 11, wherein the program instructions further direct the computing apparatus to:
in response to a selection of a second modifier key component of the modifier key components, add a second modifier key to the prompt; and
in response to a selection of a second modifier value component of the modifier value components, add a second modifier value to the prompt.

13. The computing apparatus of claim 12, wherein the prompt as-submitted to the foundation model includes the first modifier key, the first modifier value, the second modifier key, and the second modifier value.

14. The computing apparatus of claim 13, wherein when the first modifier key component is selected, the first modifier key is prepended to the prompt, wherein when the first modifier value component is selected, the first modifier value is appended to the prompt, wherein when the second modifier key component is selected, the second modifier key is appended to the prompt, and wherein when the second modifier value component is selected, the second modifier value is appended to the prompt.

15. The computing apparatus of claim 9, wherein the program instructions further direct the computing apparatus to:

receive, in the user interface, user input comprising a custom modifier value; and add the custom modifier value to the prompt.

16. The computing apparatus of claim 9, wherein each of the modifier key components comprises a graphical button which when selected causes a corresponding modifier key to be added to the prompt and wherein each of the modifier value components comprises a selectable text element which when selected causes a corresponding one of the modifier values to be added to the prompt.

17. One or more computer-readable storage media having program instructions stored thereon that, when executed by one or more processors of a computing device, direct the computing device to at least:

display, in a user interface to an application, modifier key components for modifying a prompt to be submitted to a foundation model, wherein a selection of any one of the modifier key components adds a corresponding modifier key to the prompt;

submit, to the foundation model, a request for modifier values, wherein the request comprises contextual information from the prompt in a current incomplete state, and wherein the prompt comprises a modifier key corresponding to a selected one of the modifier key components;

receive, from the foundation model, the modifier values generated by the foundation model based on the request, wherein the modifier values complete the modifier key to form an instruction for directing the foundation model in generating content;

display, in the user interface, modifier value components for adding the modifier values to the prompt, wherein a selection of any one of the modifier value components adds a corresponding one of the modifier values to the prompt;

submit the prompt, including the modifier key and the corresponding one of the modifier values, to the foundation model; and display a reply from the foundation model in the user interface.

18. The one or more computer readable storage media of claim 17, wherein the program instructions further direct the computing device to at least:

in response to a selection of a first modifier key component of the modifier key components, add a first modifier key to the prompt; and in response to a selection of a first modifier value component of the modifier value components, add a first modifier value to the prompt.

19. The one or more computer readable storage media of claim 18, wherein the program instructions further direct the computing device to:

in response to a selection of a second modifier key component of the modifier key components, add a second modifier key to the prompt; and in response to a selection of a second modifier value component of the modifier value components, add a second modifier value to the prompt.

20. The one or more computer readable storage media of claim 19, wherein the prompt as-submitted to the foundation model includes the first modifier key, the first modifier value, the second modifier key, and the second modifier value.

* * * * *